United States Patent
Lei

(10) Patent No.: US 11,115,158 B2
(45) Date of Patent: Sep. 7, 2021

(54) DATA ACKNOWLEDGEMENT IN A WIRELESS COMMUNICATION SYSTEM

(71) Applicant: Lenovo Innovations Limited (Hong Kong), Hong Kong (CN)

(72) Inventor: Haipeng Lei, Beijing (CN)

(73) Assignee: Lenovo Innovations Limited (Hong Kong), Hong Kong (CN)

( * ) Notice: Subject to any disclaimer, the term of this patent is extended or adjusted under 35 U.S.C. 154(b) by 291 days.

(21) Appl. No.: 16/301,380

(22) PCT Filed: May 13, 2016

(86) PCT No.: PCT/CN2016/082101
§ 371 (c)(1),
(2) Date: Nov. 13, 2018

(87) PCT Pub. No.: WO2017/193390
PCT Pub. Date: Nov. 16, 2017

(65) Prior Publication Data
US 2020/0322098 A1    Oct. 8, 2020

(51) Int. Cl.
*H04W 4/00* (2018.01)
*H04L 1/18* (2006.01)

(52) U.S. Cl.
CPC .......... *H04L 1/1861* (2013.01); *H04L 1/1864* (2013.01); *H04L 1/1896* (2013.01)

(58) Field of Classification Search
None
See application file for complete search history.

(56) References Cited

U.S. PATENT DOCUMENTS

| | | | |
|---|---|---|---|
| 2015/0131494 A1* | 5/2015 | He | H04B 7/0452 370/280 |
| 2015/0256298 A1* | 9/2015 | Nammi | H04B 7/0478 375/260 |
| 2019/0159189 A1* | 5/2019 | Wei | H04L 1/1896 |
| 2020/0028634 A1* | 1/2020 | Guan | H04L 1/1829 |
| 2020/0229187 A1* | 7/2020 | Marinier | H04W 72/0446 |

FOREIGN PATENT DOCUMENTS

| | | |
|---|---|---|
| CN | 103516496 A | 1/2014 |
| CN | 104335498 A | 2/2015 |
| WO | 2014047860 A1 | 4/2014 |

OTHER PUBLICATIONS

Huawei, Hisilicon, "Discussion on SPS HARQ-ACK bit handling in case of dynamic codebook configuration for eCA", 3GPP TSG RAN WG1 Meeting #84bis R1-162105, Apr. 11-15, 2016, pp. 1-5.
PCT/CN2016/082101, "International Search Report", dated Jan. 26, 2017, pp. 1-3.

(Continued)

*Primary Examiner* — Phirin Sam
(74) *Attorney, Agent, or Firm* — Kunzler Bean & Adamson

(57) ABSTRACT

Apparatuses, methods, and systems are disclosed for data acknowledgment. One apparatus includes a processor that determines a duration for a downlink ("DL") burst. The apparatus includes a transmitter that transmits the DL burst having the duration, and signaling indicating a hybrid automatic repeat request acknowledgement ("HARQ-ACK") codebook size for transmission of HARQ-ACK feedback corresponding to the DL burst.

18 Claims, 6 Drawing Sheets

(56) References Cited

OTHER PUBLICATIONS

PCT/CN2016/082101. "Written Opinion of the International Searching Authority", dated Jan. 26, 2017, pp. 1-3.
Huawei, Hisilicon, "Dynamic adaptation of Pucch formats for HARQ-ACK feedback", 3GPP TSG RAN WG1 Meeting #82bis R1-155093, Oct. 5-9, 2015. pp. 1-6.
NTT Docomo, Inc. "HARQ-ACK feedback for CA with up to 32 CCs", 3GPP TSG RAN WG1 Meeting #82 R1-154429, Aug. 24-28, 2015, pp. 1-5.
LG Electronics, "HARQ-ACK payload adaptation for Rel-13 CA", 3GPP TSG RAN WG1 Meeting #82bis R1-155376, Oct. 5-9, 2015, pp. 1-8.
Huawei, Hisilicon, "Remaining issues for dynamic HARQ-ACK codebook determination", 3GPP TSG RAN WG1 Meeting #83 R1-156452, Nov. 15-22, 2015, pp. 1-11.

\* cited by examiner

DATA ACKNOWLEDGEMENT IN A WIRELESS COMMUNICATION SYSTEM

FIELD

The subject matter disclosed herein relates generally to wireless communications and more particularly relates to data acknowledgement in a wireless communication system.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Downlink Control Information ("DCI"), Downlink ("DL"), Enhanced Clear Channel Assessment ("eCCA"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Hybrid Automatic Repeat Request ("HARQ"), Licensed Assisted Access ("LAA"), Load Based Equipment ("LBE"), Listen-Before-Talk ("LBT"), Long Term Evolution ("LTE"), Negative-Acknowledgment ("NACK") or ("NAK"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Receive ("RX"), Single Carrier Frequency Division Multiple Access ("SC-FDMA"), Secondary Cell ("SCell"), Shared Channel ("SCH"), Signal-to-Interference-Plus-Noise Ratio ("SINR"), Transport Block ("TB"), Transport Block Size ("TBS"), Time-Division Duplex ("TDD"), Time Division Multiplex ("TDM"), Transmit ("TX"), Uplink Control Information ("UCI"), User Entity/Equipment (Mobile Terminal) ("UE"), Uplink ("UL"), Universal Mobile Telecommunications System ("UMTS"), and Worldwide Interoperability for Microwave Access ("WiMAX").

In wireless communications networks, DL TBs may be carried on the PDSCH. A maximum of two TBs may be transmitted on PDSCH in one serving cell and in a subframe. As used herein, "HARQ-ACK" may represent collectively the Positive Acknowledge ("ACK") and the Negative Acknowledge ("NAK"). ACK means that a TB is correctly received while NAK means a TB is erroneously received.

HARQ-ACK feedback bits corresponding to a PDSCH may be transmitted either on the PUCCH or on the PUSCH. For 3GPP Release 8 LTE FDD, HARQ-ACK feedback bits corresponding to PDSCH received in subframe n-4 are transmitted in subframe n. See 3GPP TS36.213 v12.6.0. Furthermore, for 3GPP Release 8 LTE TDD, HARQ-ACK feedback bits corresponding to PDSCH received in subframe n-k, where k belongs to the set K ($\{k_0, k_1, \cdots, k_{M-1}\}$), are transmitted in subframe n. It should be noted that for LTE TDD, the elements in set K depends on the TDD UL/DL configuration, as well as the subframe index n, as shown in Table 1. A HARQ-ACK codebook size is determined by the number of elements of set K for a TDD UL/DL configuration.

TABLE 1

| UL/DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The LTE TDD UL/DL configurations are shown in Table 2. It should be noted that in Table 2, "D" represents a DL subframe, "U" represents an UL subframe, and "S" represents a special subframe. The timing relationship between the subframe containing the PDSCH and the subframe containing the corresponding HARQ-ACK feedback may be referred to as the HARQ timing.

TABLE 2

| Uplink-downlink config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A frame structure for LTE FDD may be used in certain configurations. A radio frame of 10 milliseconds ("ms") may include 10 subframes, each of which is 1 ms. Each subframe further may include two slots, each of which is 0.5 ms. Within each slot, a number of OFDM symbols may be transmitted. The transmitted signal in each slot on an antenna port may be described by a resource grid comprising $N_{RB}^{DL} N_{sc}^{RB}$ subcarriers and $N_{symb}^{DL}$ OFDM symbols, where $N_{RB}^{DL}$ is number of RBs in the DL (which is dependent on the transmission bandwidth of a cell); $N_{sc}^{RB}$ is the number of subcarriers in each RB; and each subcarrier occupies a certain frequency of size $\Delta f$. The values of $N_{sc}^{RB}$, $\Delta f$, and $N_{symb}^{DL}$ may depend on a cyclic prefix as shown in Table 3.

TABLE 3

| Configuration | | $N_{sc}^{RB}$ | $N_{symb}^{DL}$ |
|---|---|---|---|
| Normal Cyclic Prefix | $\Delta f$ = 15 kHz | 12 | 7 |
| Extended Cyclic Prefix | $\Delta f$ = 15 kHz | | 6 |
| | $\Delta f$ = 7.5 kHz | 24 | 3 |

In certain configurations, an antenna port may refer to a logical antenna port (i.e., it may not necessarily refer to a physical antenna or antenna element). Mapping between an antenna port and physical antenna element(s) may be implementation specific. In other words, different devices may have a different mapping of physical antenna element(s) to the same antenna port. A receiving device may assume that the signals transmitted on the same antenna port go through the same channel. Moreover, a receiving device cannot assume signals transmitted on different antenna ports go through the same channel.

In certain configurations, carrier aggregation may be used such that more than one carrier may be aggregated by a UE to improve a transmission data rate. A UE may be able to aggregate a different number of carriers in the downlink and the uplink. For an RRC CONNECTED UE (e.g., a UE in which an RRC connection has been established), each of the aggregated carriers may be a serving cell for the UE. Among the multiple aggregated serving cells, only one cell may be the primary cell while the other cells are secondary cells. In some configurations, PUCCH may be transmitted on both the primary cell and a secondary cell. Accordingly, PUCCH overhead may be offloaded from the primary cell to a secondary cell.

In some configurations, as part of carrier aggregation, aggregation of serving cells on a licensed spectrum and an unlicensed spectrum is supported for DL transmission. In such configurations, the serving cells in the unlicensed spectrum may only be secondary cells to a UE. The operation on the unlicensed carriers is assisted by the operation on the licensed carriers, hence the name licensed assisted access ("LAA").

In certain configurations, LAA includes UL support for LAA secondary cell operation in an unlicensed spectrum. LAA may also allow for fair coexistence between Wi-Fi and LAA and fair coexistence between different LAA systems. Coexistence measures may still allow efficient operation of all coexisting technologies. PUCCH transmission may be performed on unlicensed carriers to offload PUCCH overhead from licensed carriers to unlicensed carriers. In order to support dual connectivity for LAA operation (e.g., the network node hosting the licensed carriers and the network node hosting the unlicensed carriers are geographically non-collocated and connected with non-ideal backhaul), PUCCH transmission in unlicensed carriers may be supported.

In various configurations, if there are a large number of carriers in the unlicensed spectrum and a limited number of carriers in licensed spectrum, it may be useful to offload some UCI from the licensed spectrum to the unlicensed spectrum. In some situations, the channel quality of the unlicensed spectrum may be worse than the channel quality of the licensed spectrum and there may be unpredictable channel access of unlicensed spectrum. Accordingly, HARQ-ACK corresponding to PDSCH in licensed spectrum may be transmitted in the licensed spectrum. Furthermore, HARQ-ACK transmitted in the uplink on an unlicensed spectrum may correspond to PDSCH transmitted on the unlicensed spectrum. This may be facilitated by eNB configuration.

As may be appreciated, LBT may be performed before transmissions on an unlicensed spectrum to facilitate fair coexist with other wireless systems on the same unlicensed spectrum. Moreover, for HARQ-ACK transmissions on an unlicensed carrier, LBT may be performed before actual HARQ-ACK transmissions. After an LBT is successful, a UE may start a HARQ-ACK transmission in the LAA uplink subframe according to a DL HARQ timing relationship. In contrast, HARQ-ACK transmission corresponding to DL transmission in an LAA secondary cell may not be transmitted on an LAA secondary cell uplink in response to a failed LBT for uplink channel access. Not transmitting a HARQ-ACK transmission may reduce DL throughput performance.

On an unlicensed carrier, certain configurations, such as UL/DL configurations with a series of predefined ratios between the number of UL subframes and the number of DL subframes as shown in Table 2, are not suitable due to each subframe on an unlicensed carrier potentially being a downlink subframe or an uplink subframe. Therefore, because of no certain UL/DL configurations on an unlicensed carrier, a HARQ-ACK codebook size may not be known to an eNB and/or a UE.

BRIEF SUMMARY

Apparatuses for data acknowledgment are disclosed. Methods and systems also perform the functions of the apparatus. In one embodiment, the apparatus a processor that determines a duration for a downlink ("DL") burst. In various embodiments, the apparatus includes a transmitter that transmits the DL burst having the duration, and signaling indicating a hybrid automatic repeat request acknowledgement ("HARQ-ACK") codebook size for transmission of HARQ-ACK feedback corresponding to the DL burst.

In one embodiment, the HARQ-ACK codebook size corresponds to a number of subframes occupied by the DL burst. In a further embodiment, the number of subframes occupied by the DL burst includes partial subframes occupied by the DL burst. In some embodiments, the transmitter transmits the signaling indicating the HARQ-ACK codebook size multiple times. In certain embodiments, the signaling indicating the HARQ-ACK codebook size is transmitted in a last subframe of the DL burst. In another embodiment, the signaling indicating the HARQ-ACK codebook size is transmitted in a subframe prior to a last subframe of the DL burst. In various embodiments, the signaling indicating the HARQ-ACK codebook size is transmitted in downlink control information ("DCI") in common search space. In some embodiments, the signaling indicating the HARQ-ACK codebook size is transmitted in a DL grant.

A method for data acknowledgment, in one embodiment, includes determining a duration for a DL burst. In various embodiments, the method may include transmitting the DL burst having the duration, and signaling indicating a HARQ-ACK codebook size for transmission of HARQ-ACK feedback corresponding to the DL burst.

In one embodiment, an apparatus includes a receiver that receives data from a DL burst, and receives signaling indicating a HARQ-ACK codebook size for transmission of HARQ-ACK feedback corresponding to the DL burst. In various embodiments, the apparatus may include a processor that determines the HARQ-ACK codebook size based on the signaling.

In certain embodiments, the HARQ-ACK codebook size corresponds to a number of subframes occupied by the DL burst. In such embodiments, the number of subframes occupied by the DL burst includes partial subframes occupied by the DL burst. In various embodiments, the receiver receives the signaling indicating the HARQ-ACK codebook size multiple times. In some embodiments, the receiver receives the signaling indicating the HARQ-ACK codebook size in a last subframe of the DL burst.

In one embodiment, the receiver receives the signaling indicating the HARQ-ACK codebook size in a subframe prior to a last subframe of the DL burst. In certain embodiments, the receiver receives the signaling indicating the HARQ-ACK codebook size in DCI in common search space. In some embodiments, the receiver receives the signaling indicating the HARQ-ACK codebook size in a DL grant. In various embodiments, the apparatus includes a transmitter. In such embodiments, the processor generates a HARQ-ACK feedback corresponding to the DL burst and the transmitter transmits the HARQ-ACK feedback. In one embodiment, a number of HARQ-ACK bits in the HARQ-ACK feedback matches the HARQ-ACK codebook size for one-codeword transmission modes. In certain embodiments, a number of HARQ-ACK bits in the HARQ-ACK feedback is double the HARQ-ACK codebook size for two-codeword transmission modes.

Another method for data acknowledgment, in one embodiment, includes receiving data from a DL burst, and receiving signaling indicating a HARQ-ACK codebook size for transmission of HARQ-ACK feedback corresponding to the DL burst. In various embodiments, the method includes determining the HARQ-ACK codebook size based on the signaling.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
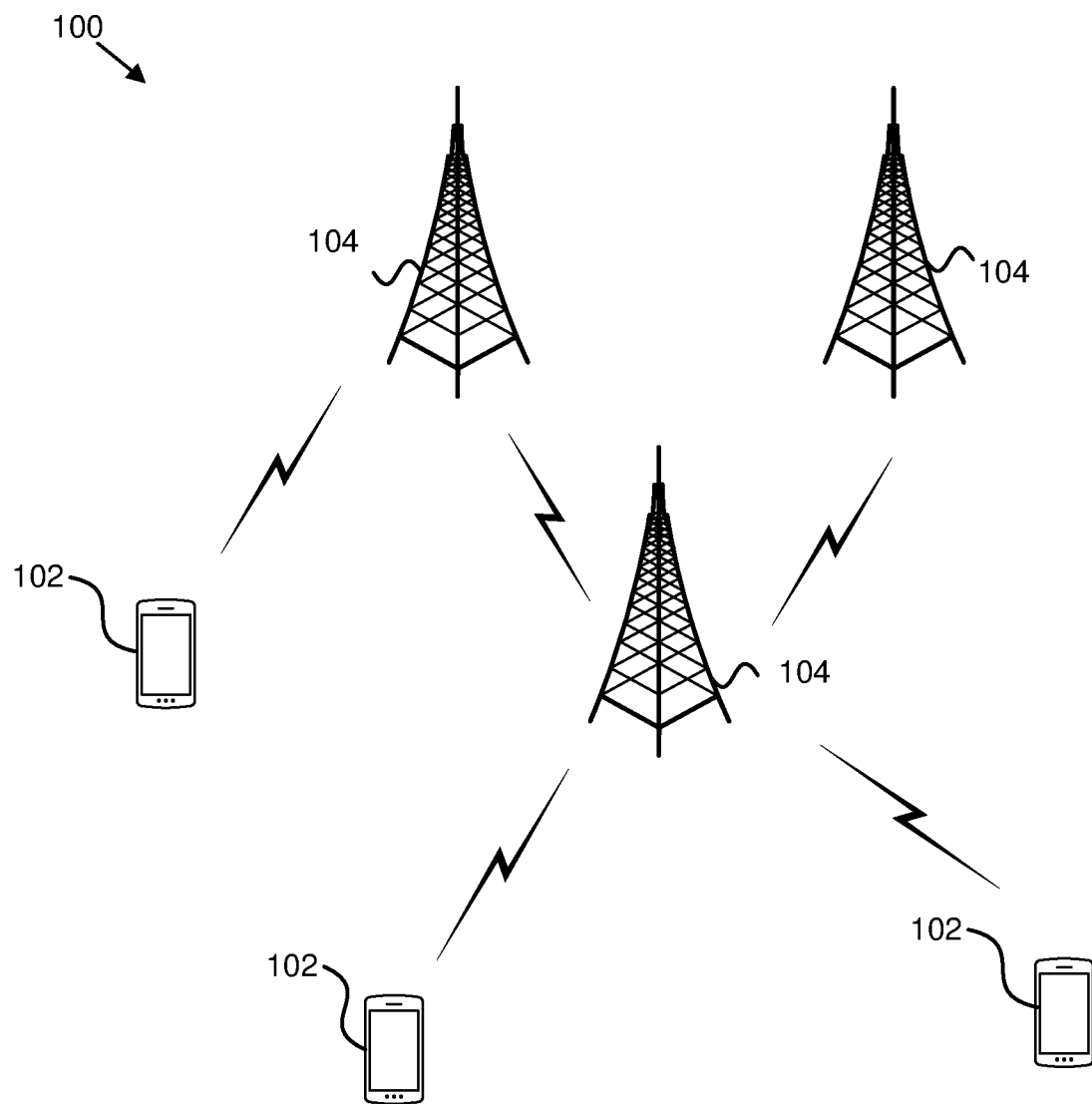
FIG. 1 is a schematic block diagram illustrating one embodiment of a wireless communication system for data acknowledgment.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for data acknowledgment. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may determine a duration for a DL burst. The base unit 104 may transmit the DL burst having the duration, and signaling indicating a HARQ-ACK codebook size for transmission of HARQ-ACK feedback corresponding to the DL burst. Accordingly, a remote unit 102 may receive information indicating a HARQ-ACK codebook size.

In another embodiment, a remote unit 102 may receive data from a DL burst, and receiving signaling indicating a HARQ-ACK codebook size for transmission of HARQ-ACK feedback corresponding to the DL burst. In such an embodiment, the remote unit 102 may determine the HARQ-ACK codebook size based on the signaling.

Figure 2:
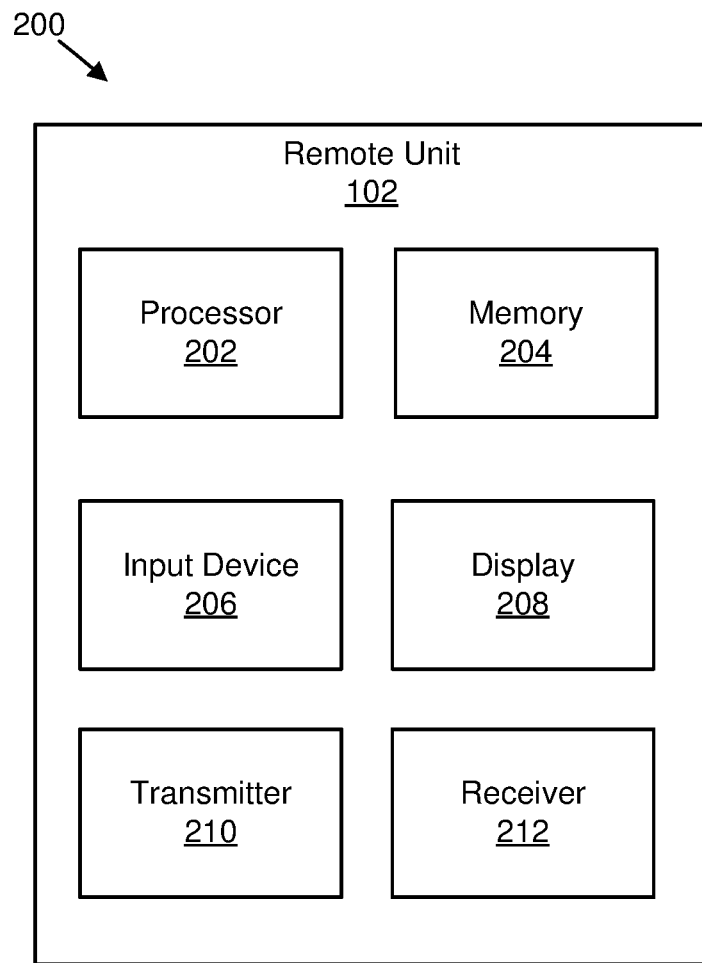
FIG. 2 is a schematic block diagram illustrating one embodiment of an apparatus that may be used for transmitting a data acknowledgment.

FIG. 2 depicts one embodiment of an apparatus 200 that may be used for transmitting a data acknowledgment. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212. In certain embodiments, the processor 202 may determine a HARQ-ACK codebook size from data received from a DL burst.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to an indication to be provided to another device. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 is used to transmit HARQ-ACK feedback to the base unit 104 corresponding to a DL burst. In certain embodiments, the receiver 212 may be used to receive data. In certain embodiments, the receiver 212 is used to receive data from a DL burst, and receive signaling indicating a HARQ-ACK codebook size for transmission of HARQ-ACK feedback corresponding to the DL burst. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
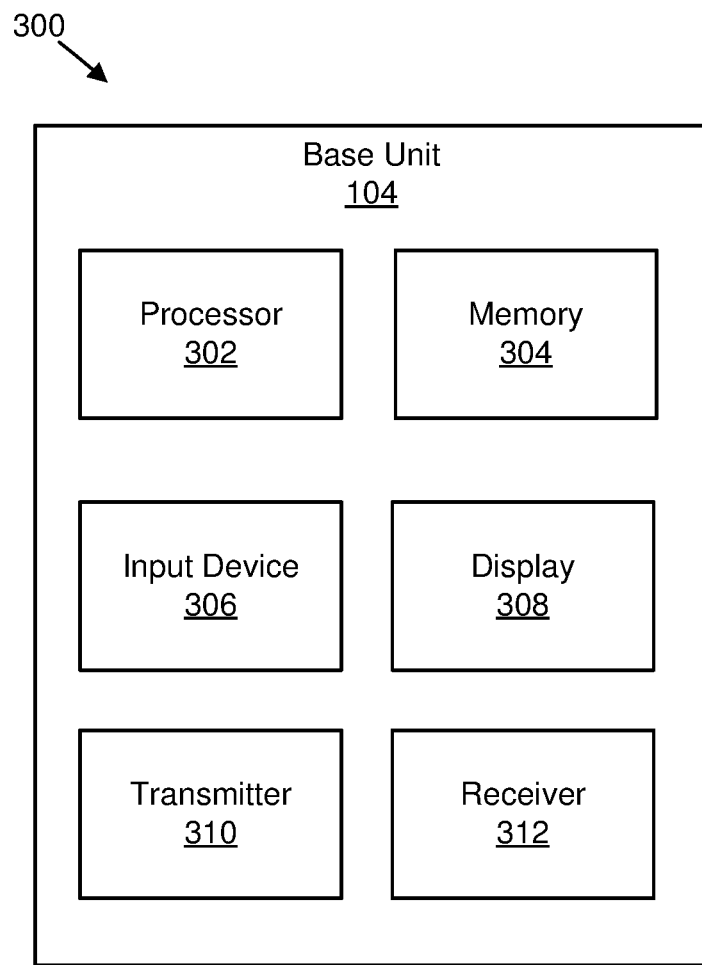
FIG. 3 is a schematic block diagram illustrating one embodiment of an apparatus that may be used for receiving a data acknowledgment.

FIG. 3 depicts one embodiment of an apparatus 300 that may be used for receiving a data acknowledgment. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, and the display 308 may be substantially similar to the processor 202, the memory 204, the input device 206, and the display 208 of the remote unit 102, respectively. In certain embodiments, the processor 302 may be used to a duration for a DL burst.

The transmitter 310 is used to provide DL communication signals to the remote unit 102 and the receiver 312 is used to receive UL communication signals from the remote unit 102. In certain embodiments, the transmitter 310 is used to transmit the DL burst having the duration, and transmit signaling indicating a HARQ-ACK codebook size for transmission of HARQ-ACK feedback corresponding to the DL burst. In one embodiment, the receiver 312 is used to receive an acknowledgement from a remote unit 102 in response to the DL burst. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
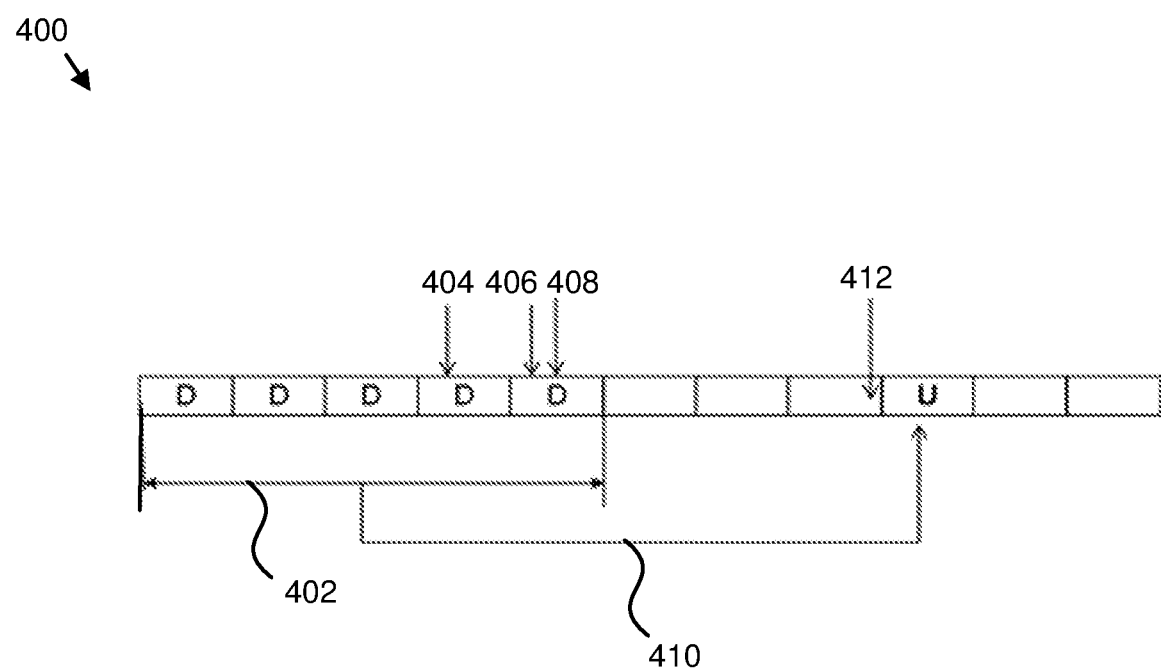
FIG. 4 illustrates one embodiment of communication for establishing a HARQ-ACK codebook size for a data acknowledgment.

FIG. 4 illustrates one embodiment of communication 400 for establishing a HARQ-ACK codebook size for a data acknowledgment. Specifically, a DL burst 402 from a base unit 104 to a remote unit 102 is illustrated. The DL burst 402 includes a first signaling 404, a second signaling 406, and a UL grant 408. In response to the DL burst 402, the remote unit 104 may respond with a data acknowledgment 410 after performing an LBT 412. The data acknowledgment 410 may be considered HARQ-ACK feedback that includes a number of HARQ-ACK bits. The HARQ-ACK bits each indicate a positive acknowledgment or a negative acknowledgment corresponding to portions of the DL burst 402.

As used herein, HARQ-ACK codebook size refers to a number of HARQ-ACK bits to be used for HARQ-ACK feedback. In one embodiment, the HARQ-ACK codebook size is determined by the length (e.g., duration) of the DL burst 402. For example, the length of the DL burst 402 is five subframes. In certain embodiments, the length of the DL burst 402 is a number of DL subframes in the DL burst 402 including partial subframes if PDSCH is transmitted in a partial subframe. The partial subframe may be an initial partial subframe and/or an ending partial subframe. By changing the length of the DL burst 402, the HARQ-ACK codebook size may be dynamically changed.

In certain embodiments, the HARQ-ACK codebook size (e.g., DL burst 402 length) may be transmitted in the first signaling 404 and/or second signaling 406. The first signaling 404 and/or second signaling 406 may be transmitted in DCI in common search space. For example, the first signaling 404 and/or second signaling 406 may be transmitted in the common DCI format 1C on an LAA SCell. In one embodiment, a number of needed bits for indicating the HARQ-ACK codebook size is dependent on a possible burst length. According to certain regulation requirements, maximum channel occupancy time is 10 ms so that the number of needed bits for indicating the HARQ-ACK codebook size is 4 to cover the burst length from 1 ms to 10 ms. In another embodiment, the possible burst length may be configured in a set and each element in the set refers to a channel occupancy time, e.g., set {4, 6, 8, 10} or set {2, 4, 6, 8}; therefore, two bits are enough to indicate each channel occupancy time. In a further embodiment, for set {2, 4, 6, 8, 10}, three bits are needed.

In one embodiment, a base unit 104 may know the position of an initial subframe and an ending subframe of the DL burst 402 as well as the burst length. Accordingly, the base unit 104 may indicate the HARQ-ACK codebook size (e.g., DL burst length) in the common DCI format 1C on an LAA SCell in the ending DL subframe using the second signaling 406 and the DL subframe prior to the ending DL subframe using the first signaling 404. Because this DCI format 1C is transmitted in two consecutive subframes, the reliability of the signaling is increased.

In another embodiment, a remote unit 102 on the LAA SCell, upon reception of the common DCI format 1C in the ending DL subframe using the second signaling 406 and the DL subframe prior to the ending DL subframe using the first signaling 404, the remote unit 102 may know the HARQ-ACK codebook size and the current DL burst 402 length. Due to the transmitted subframes in one DL burst 402 being consecutive in the time domain, and the remote unit 102 knowing the ending position of a current DL burst 402 by detecting the common DCI format 1C in the LAA SCell, the remote unit 102 may derive the whole burst and generate HARQ-ACK feedback corresponding to each DL subframe within the current DL burst 402.

In certain embodiments, for one-codeword transmission modes (e.g., transmission modes 1, 2, 5, 6, and 7) a number of generated HARQ-ACK bits may be equal to the indicated HARQ-ACK codebook size. In various embodiments, for two-codeword transmission modes (e.g., transmission modes 3, 4, 8, and 9) a number of generated HARQ-ACK bits may be double the indicated HARQ-ACK codebook size. After determining the HARQ-ACK bits, a remote unit 102 may transmit those bits on LAA SCell PUSCH or PUCCH. In circumstances in which a remote unit 102 does not detect any PDSCH transmissions for itself, the remote unit 102 may not transmit any HARQ-ACK feedback on LAA SCell.

In some embodiments, the HARQ-ACK codebook size may be transmitted in each DL grant for PDSCH scheduling on an unlicensed carrier. At a remote unit 102, upon reception of the HARQ-ACK codebook size in each DL grant and the ending subframe for current burst, HARQ-ACK feedback may be generated. For one-codeword transmission modes (e.g., transmission modes 1, 2, 5, 6, and 7) the number of generated HARQ-ACK bits may be equal to the indicated HARQ-ACK codebook size. For two-codeword transmission modes (e.g., transmission modes 3, 4, 8, and 9) the number of generated HARQ-ACK bits may be double the indicated HARQ-ACK codebook size. After determining the HARQ-ACK bits, a remote unit 102 may transmit those bits on LAA SCell PUSCH or PUCCH. In circumstances in which a remote unit 102 does not detect any PDSCH transmissions for itself, the remote unit 102 may not transmit any HARQ-ACK feedback on LAA SCell.

As described above, a remote unit 102 may know the HARQ-ACK codebook size and synchronize this knowledge with a base unit 104. It should be noted that any method for determining a HARQ-ACK codebook size described herein may work in situations in which HARQ-ACK feedback corresponding to DL transmissions on multiple unlicensed carriers are transmitted on one uplink LAA SCell PUSCH or PUCCH.

Figure 5:
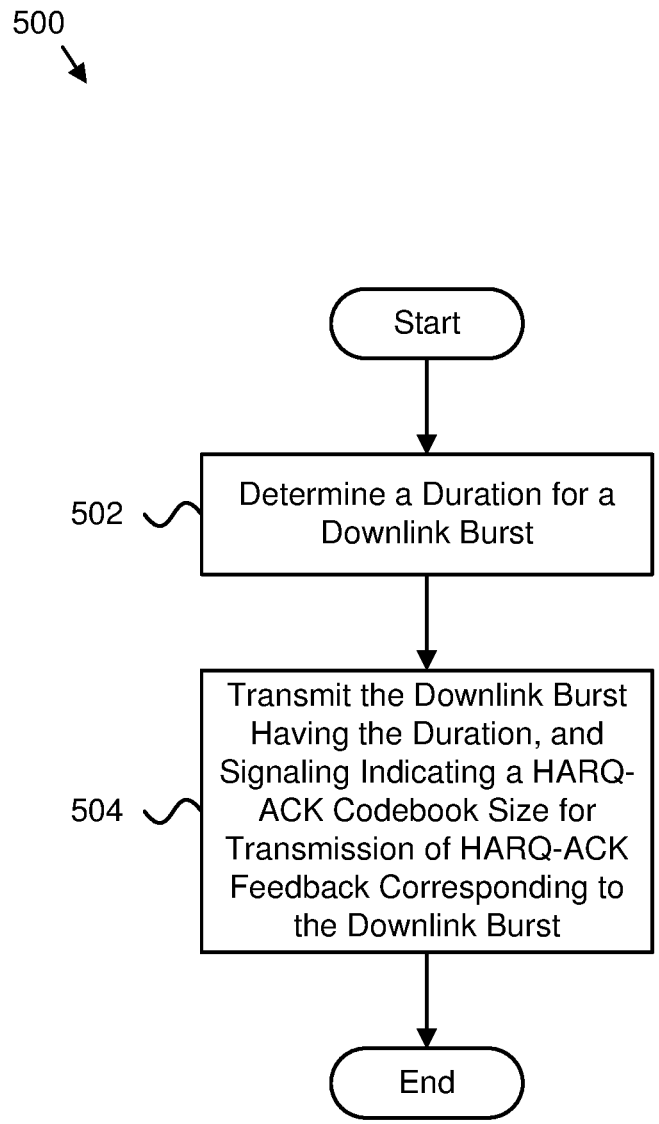
FIG. 5 is a schematic flow chart diagram illustrating one embodiment of a method for transmitting a HARQ-ACK codebook size.

FIG. 5 is a schematic flow chart diagram illustrating one embodiment of a method 500 for transmitting a HARQ-ACK codebook size. In some embodiments, the method 500 is performed by an apparatus, such as the base unit 104. In certain embodiments, the method 500 may be performed by a processor executing program code, for example, a microcontroller, a microprocessor, a CPU, a GPU, an auxiliary processing unit, a FPGA, or the like.

The method 500 may include determining 502 a duration for a DL burst. In one embodiment, the duration for the DL burst may match a number of subframes occupied by the DL burst, which may include partial subframes occupied by the DL burst. The method 500 may also include transmitting 504 the DL burst having the duration, and signaling indicating a HARQ-ACK codebook size for transmission of HARQ-ACK feedback corresponding to the DL burst, and the method 500 may end. In some embodiments, the method 500 includes transmitting the signaling indicating the HARQ-ACK codebook size multiple times. In certain embodiments, the signaling indicating the HARQ-ACK codebook size is transmitted in a last subframe of the DL burst. In another embodiment, the signaling indicating the HARQ-ACK codebook size is transmitted in a subframe prior to a last subframe of the DL burst. In various embodiments, the signaling indicating the HARQ-ACK codebook size is transmitted in downlink control information ("DCI") in common search space. In some embodiments, the signaling indicating the HARQ-ACK codebook size is transmitted in a DL grant.

In one embodiment, the HARQ-ACK codebook size corresponds to a number of subframes occupied by the DL burst. In a further embodiment, the number of subframes occupied by the DL burst includes partial subframes occupied by the DL burst.

Figure 6:
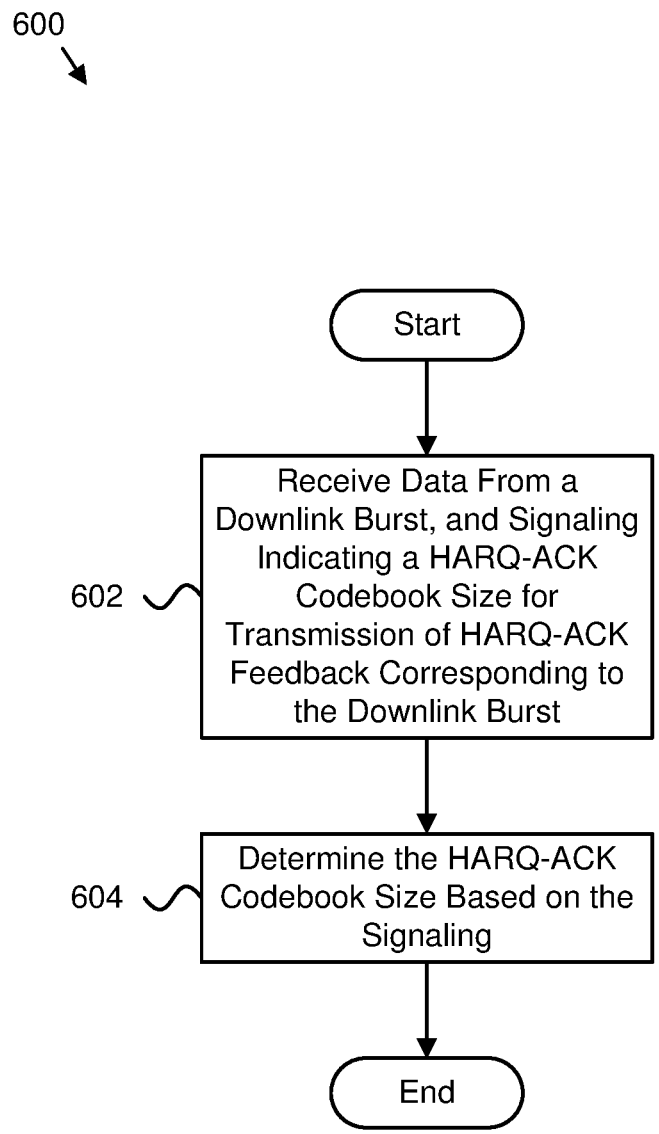
FIG. 6 is a schematic flow chart diagram illustrating one embodiment of a method for receiving a HARQ-ACK codebook size.

FIG. 6 is a schematic flow chart diagram illustrating one embodiment of a method 600 for receiving a HARQ-ACK codebook size. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

The method 600 may include receiving 602 data from a DL burst, and receiving signaling indicating a HARQ-ACK codebook size for transmission of HARQ-ACK feedback corresponding to the DL burst. In various embodiments, the method 600 includes receiving the signaling indicating the HARQ-ACK codebook size multiple times. In some embodiments, the method 600 includes receiving the signaling indicating the HARQ-ACK codebook size in a last subframe of the DL burst. In one embodiment, the method 600 includes receiving the signaling indicating the HARQ-ACK codebook size in a subframe prior to a last subframe of the DL burst. In certain embodiments, the method 600 includes receiving the signaling indicating the HARQ-ACK codebook size in DCI in common search space. In some embodiments, the method 600 includes receiving the signaling indicating the HARQ-ACK codebook size in a DL grant. The method 600 may also include determining 604 the HARQ-ACK codebook size based on the signaling, and the method 600 may end.

In certain embodiments, the HARQ-ACK codebook size corresponds to a number of subframes occupied by the DL burst. In such embodiments, the number of subframes occupied by the DL burst includes partial subframes occupied by the DL burst. In various embodiments, the method 600 includes generating a HARQ-ACK feedback corresponding to the DL burst and transmitting the HARQ-ACK feedback. In one embodiment, a number of HARQ-ACK bits in the HARQ-ACK feedback matches the HARQ-ACK codebook size for one-codeword transmission modes. In certain embodiments, a number of HARQ-ACK bits in the HARQ-ACK feedback is double the HARQ-ACK codebook size for two-codeword transmission modes.

While embodiments described herein may be described for HARQ-ACK transmission or reception on a carrier of an unlicensed spectrum. The disclosed embodiments may be equally applicable for HARQ-ACK transmission or reception on a carrier of a licensed spectrum.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
    a processor that determines a duration for a downlink ("DL") burst; and
    a transmitter that transmits the DL burst having the duration, and signaling indicating a duration of the DL burst in downlink control information, wherein a size of a hybrid automatic repeat request acknowledgement ("HARQ-ACK") codebook corresponding to the DL burst;
        equals the duration for a one-codeword transmission mode; or
        is double the duration for a two-codeword transmission mode, wherein the duration is indicated by a number of subframes within the DL burst.

2. The apparatus of claim 1, wherein the transmitter transmits the signaling a plurality of times.

3. A method comprising:
    determining a duration for a downlink ("DL") burst; and
    transmitting the DL burst having the duration, and signaling indicating a size of a hybrid automatic repeat request acknowledgement ("HARQ-ACK") codebook corresponding to the DL burst: p2 the size of the HARQ-ACK codebook equals a number of subframes within the DL burst for a one-codeword transmission mode; or
        the size of the HARQ-ACK codebook is double the number of subframes within the DL burst for a two-codeword transmission mode.

4. The method of claim 3, wherein the duration equals a number of subframes occupied by the DL burst.

5. The method of claim 4, wherein the number of subframes occupied by the DL burst comprises partial subframes occupied by the DL burst.

6. The method of claim 3, wherein the signaling is transmitted in a last subframe of the DL burst.

7. The method of claim 3, wherein the signaling is transmitted in a subframe prior to a last subframe of the DL burst.

8. The method of claim 3, wherein the signaling is transmitted in downlink control information ("DCI") in common search space.

9. The method of claim 3, wherein the information is transmitted in a DL grant.

10. An apparatus comprising:
- a receiver that receives data from a downlink ("DL") burst, and receives signaling indicating a size of a hybrid automatic repeat request acknowledgement ("HARQ-ACK") codebook corresponding to the DL burst; and
- a processor that determines the size of the HARQ-ACK codebook based on the signaling, wherein:
  - the size of the HARQ-ACK codebook equals a number of subframes witin the DL burst for a one-codeword transmission mode; or
  - the size of the HARQ-ACK codebook is double the number of subframes within the DL burst for a two-codeword transmission mode.

11. The apparatus of claim 10, wherein the receiver receives the signaling a plurality of times.

12. The apparatus of claim 10, wherein the receiver receives the signaling in a last subframe of the DL burst.

13. The apparatus of claim 10, wherein the receiver receives the signaling in a subframe prior to a last subframe of the DL burst.

14. The apparatus of claim 10, wherein the receiver receives the signaling in downlink control information ("DCI") in common search space.

15. The apparatus of claim 10, wherein the receiver receives the signaling in a DL grant.

16. The apparatus of claim 10, further comprising a transmitter, wherein the processor generates the HARQ-ACK codebook and the transmitter transmits the HARQ-ACK codebook.

17. A method comprising:
- receiving data from a downlink ("DL") burst, and receiving signaling indicating a duration of the DL burst in downlink control information, wherein a size of a hybrid automatic repeat request acknowledgement ("HARQ-ACK") codebook corresponding to the DL burst;
  - equals the duration for a one-codeword transmission mode; or
  - is double the duration for a two-codeword transmission mode, wherein the duration is indicated by a number of subframes within the DL burst.

18. The method of claim 17, wherein the number of subframes within the DL burst comprises partial subframes occupied by the DL burst.

* * * * *